(12) United States Patent
Takahashi

(10) Patent No.: US 11,691,100 B2
(45) Date of Patent: Jul. 4, 2023

(54) FILTRATION UNIT

(71) Applicant: FUJI FILTER MANUFACTURING CO., LTD., Tokyo (JP)

(72) Inventor: Yuichi Takahashi, Tokyo (JP)

(73) Assignee: FUJI FILTER MANUFACTURING CO., LTD., Tokyo (JP)

( * ) Notice: Subject to any disclaimer, the term of this patent is extended or adjusted under 35 U.S.C. 154(b) by 233 days.

(21) Appl. No.: 17/069,852

(22) Filed: Oct. 13, 2020

(65) Prior Publication Data

US 2021/0023483 A1 Jan. 28, 2021

Related U.S. Application Data

(63) Continuation of application No. 15/566,690, filed as application No. PCT/JP2016/061751 on Apr. 12, 2016, now Pat. No. 10,828,583.

(30) Foreign Application Priority Data

Apr. 20, 2015 (JP) ................................. 2015-085987

(51) Int. Cl.
*B01D 29/00* (2006.01)
*B01D 46/24* (2006.01)
(Continued)

(52) U.S. Cl.
CPC ......... *B01D 46/2403* (2013.01); *B01D 24/48* (2013.01); *B01D 29/11* (2013.01);
(Continued)

(58) Field of Classification Search
CPC .... B01D 29/6476; B01D 29/11; B01D 29/35; B01D 29/50; B01D 29/54; B01D 29/60;
(Continued)

(56) References Cited

U.S. PATENT DOCUMENTS 356,243 A * 1/1887 Elkins
1,033,745 A * 7/1912 Smith .................. B01D 29/114
210/396

(Continued)

FOREIGN PATENT DOCUMENTS

CN 2892243 Y 4/2007
CN 104368182 A 2/2015
(Continued)

OTHER PUBLICATIONS

The State Intellectual Property Office of People'S Republic of China, Office Action dated May 6, 2020 in Chinese Application No. 201680022951.6, with English translation, 20 pages.
(Continued)

*Primary Examiner* — T. Bennett McKenzie
(74) *Attorney, Agent, or Firm* — Masuvalley & Partners; Peter R. Martinez

(57) ABSTRACT

A device is provided that provides an unbiased filtration effect and an effect of removing captured substances through backwashing by causing a fluid to uniformly pass through a filter element over the entire length in an axial direction at the time of backwashing so as to efficiently rotate a captured-substance removal tool in a filtration unit 1 which includes the captured-substance removal tool 20 axially supported inside the tubular filter element 2 to be rotatable.

2 Claims, 8 Drawing Sheets

(51) Int. Cl.
| | |
|---|---|
| *B01D 29/66* | (2006.01) |
| *B01D 24/48* | (2006.01) |
| *B01D 29/50* | (2006.01) |
| *B01D 29/11* | (2006.01) |
| *B01D 65/04* | (2006.01) |
| *B01D 29/60* | (2006.01) |
| *B01D 46/60* | (2022.01) |
| *B01D 46/70* | (2022.01) |
| *B01D 46/681* | (2022.01) |
| *B01D 29/35* | (2006.01) |
| *B01D 29/54* | (2006.01) |
| *B01D 29/64* | (2006.01) |
| *C02F 1/00* | (2023.01) |
| *C02F 103/00* | (2006.01) |
| *C02F 103/02* | (2006.01) |
| *C02F 103/08* | (2006.01) |

(52) U.S. Cl.
CPC ............ *B01D 29/35* (2013.01); *B01D 29/50* (2013.01); *B01D 29/54* (2013.01); *B01D 29/60* (2013.01); *B01D 29/6476* (2013.01); *B01D 29/66* (2013.01); *B01D 46/24* (2013.01); *B01D 46/60* (2022.01); *B01D 46/681* (2022.01); *B01D 46/70* (2022.01); *B01D 65/04* (2013.01); *C02F 1/001* (2013.01); *C02F 2103/007* (2013.01); *C02F 2103/008* (2013.01); *C02F 2103/023* (2013.01); *C02F 2103/08* (2013.01)

(58) Field of Classification Search
CPC ...... B01D 29/66; B01D 46/70; B01D 46/681; B01D 46/60; B01D 46/24; B01D 46/2403; B01D 24/38; B01D 65/04; C02F 1/001; C02F 2103/007; C02F 2103/008; C02F 2103/023; C02F 2103/08
USPC ................ 210/153–172.6, 300; 55/296–300
See application file for complete search history.

(56) References Cited

U.S. PATENT DOCUMENTS

| | | | |
|---|---|---|---|
| 2,408,741 A | | 8/1944 | Dodge |
| 3,616,914 A | * | 11/1971 | Reid ................... B01D 33/461 210/355 |
| 5,470,469 A | | 11/1995 | Eckman |
| 5,855,794 A | * | 1/1999 | Caracciolo, Jr. ...... B01D 33/503 210/791 |
| 6,928,692 B2 | * | 8/2005 | Oh ........................ A47L 9/1666 55/299 |
| 7,718,055 B2 | * | 5/2010 | Iou ...................... E04D 13/0409 52/302.1 |
| 8,012,225 B2 | * | 9/2011 | Pineschi ................... A47L 9/20 55/300 |
| 2006/0123753 A1 | * | 6/2006 | Sugiura ................ B01D 65/003 55/482 |
| 2009/0078625 A1 | * | 3/2009 | Palumbo ................... C02F 9/20 210/489 |
| 2011/0220586 A1 | * | 9/2011 | Levitt .................... B01D 29/23 210/791 |
| 2012/0074074 A1 | * | 3/2012 | Lean ...................... B01D 29/66 210/791 |
| 2012/0103920 A1 | * | 5/2012 | Morgan ................. B01D 29/94 210/791 |
| 2016/0228801 A1 | | 8/2016 | Takahashi et al. |

FOREIGN PATENT DOCUMENTS

| | | |
|---|---|---|
| DE | 19723798 A1 | 12/1998 |
| JP | H01-215319 A | 8/1989 |
| JP | H05-146610 A | 6/1993 |
| JP | H09-85019 A | 3/1997 |
| JP | 2012016672 A | 1/2012 |
| JP | 2013-091046 A | 5/2013 |
| JP | 2013-150947 A | 8/2013 |
| JP | 2014-034029 A | 2/2014 |
| JP | 2016-010788 A | 1/2016 |
| KR | 20130107907 A | 10/2013 |

OTHER PUBLICATIONS

European Patent Office, Extended European Search Report dated Dec. 3, 2018 in European Patent Application No. 16783051.2, 7 pages.
WIPO, Japanese International Preliminary Examining Authority, International Preliminary Report on Patentability dated Nov. 2, 2017 in International Patent Application No. PCT/JP2016/061751, with English translation, 12 pages.
WIPO, Japanese Patent Office, International Search Report dated Jul. 5, 2016 in International Patent Application No. PCT/JP2016/061751, 2 pages.
KIPO, Korean Office Action dated Jan. 6, 2023 for KR patent application No. 10-2017-7033222, 7 pages.

* cited by examiner

X–X

PRIOR ART

FILTRATION UNIT

RELATED APPLICATIONS

This application is a continuation of U.S. patent application Ser. No. 15/566,690 filed Oct. 13, 2017 entitled Filtration Unit, which is the U.S. National Phase of and claims priority to International Patent Application No. PCT/JP2016/061751, filed on Apr. 12, 2016 entitled Filtration Unit, which claims priority under 35 U.S.C. § 119 to Japanese Patent Application No. 2015-085987, filed on Apr. 20, 2015, all of which are hereby incorporated herein by reference in their entireties.

TECHNICAL FIELD

The present invention relates to a filtration unit having a structure capable of backwashing captured substances adhering to a filter element and removing the substances using a high-speed fluid flowing in the filter.

BACKGROUND ART

Conventionally, various filtration devices have been used for filtration of sea water, lake water, river water, and water of water supply, sewer, and the like, filtration of a liquid used in general industries such as cooling water or a process liquid of various devices, filtration of various raw material gases and the like used in chemical factories in order to capture and remove fine particles, dust, and the like contained therein.

When filtration using the filtration device is continued for a long period of time, solid components and gel-like dust and the like captured by a filter element accumulate in the filter element so that a resistance against a fluid passing through a filter medium increases, which eventually makes the filtration of the fluid serving as an object difficult. In order to cope with this problem, for example, an operation called "backwashing" is periodically performed to peel off the captured substances adhering to the filter element by causing the fluid to flow through the filter element in a direction opposite to that at the time of filtration, thereby restoring filtration performance of the filter element.

Although the operation of the backwashing is effective, the captured substances adhering to the filter element may remain without being completely removed. When regeneration using filtration and backwashing is repeatedly performed in such a case, the resistance against the fluid of the filter medium of the filter element does not decrease, and the filtration of the fluid serving as the object becomes difficult in some cases even if the backwashing operation is repeated.

In regard to this, there has been proposed a filtration device provided with a filter body with measures for restoring filtering performance of a filter element.

Patent Document 1 (Japanese Patent Application Laid-Open No. JP 2013-91046 A) and Patent Document 2 (Japanese Patent Application Laid-Open No. JP 2014-34029 A) disclose filter bodies configured such that a captured-substance removal brush is disposed inside a hollow tubular filter element so as to be movable in an axial direction, and captured substances adhering to an inner surface of the filter element are removed by moving the captured-substance removal brush in the axial direction using flow of a fluid during filtering or backwashing.

In the case of moving the captured-substance removal brush in the axial direction, an effect of removing the captured substances is further enhanced when a filter hole forming the filter element has an elongated hole (slit) shape along the axial direction.

Conversely, these filter bodies need to be configured such that the axial direction of the filter element and a longitudinal direction of the filter hole match each other. Thus, there is a limit in a clogging elimination effect even if the above-described movable captured-substance removal brush is applied to the tubular filter element using a wedge wire or a notch wire of which longitudinal direction of the elongated hole-shaped filter hole is a circumferential direction.

Patent Document 3 (Japanese Patent Application Laid-Open No. JP 2013-150947 A) discloses a configuration in which a rotating body having a spiral blade is rotatably disposed inside a tubular filter element having an opening at one end, and adhering captured substances are removed by rubbing an inner surface of the filter element by a circumferential edge of the spiral blade rotating during backwashing. The rotating body has a configuration in which the spiral blade is provided to project around a tapered shaft body of which diameter gradually increases from an opening end of the filter element toward a closing end, and a backwashing fluid flowing backward inside the filter element during backwashing is received over the entire rotating body to rotate the rotating body.

However, a resistance of the backwashing fluid passing through the filter medium at during backwashing decreases when a resistance of a filter medium is low, and thus, the backwashing fluid flows to be concentrated only in a region close to an end at an opening side from which the backwashing fluid is discharged so that the backwashing fluid does not sufficiently flow in a region at the closing end side opposite to the opening and it is difficult to eliminate clogging at a filter element portion corresponding to this region in Patent Document 3 (Japanese Patent Application Laid-Open No. JP 2013-150947 A).

Further, since the backwashing fluid flows only in the region close to the end of the opening, it becomes difficult to sufficiently apply a rotational force to the spiral blade, and the captured-substance removal effect decreases.

In addition, a flow path formed by the spiral blade around the shaft body has a spiral shape, and the flow path has a structure to become narrower as going farther from the opening. Thus, such a narrow flow path becomes a resistance against the backwashing fluid during backwashing and becomes a factor that prevents the flow of the backwashing fluid. When a flow amount of the backwashing fluid decreases, a force of conveying the captured substance, which has been removed from an inner wall of the filter element by rotation of the rotating body, toward the opening decreases. For this reason, the captured substances remain in the narrow flow path in a region far from the opening, and are highly likely to become a fixed mass. In such a case, this mass of the captured substances further interferes with the flow of the backwashing fluid and becomes a resistance against the rotation of the rotating body.

SUMMARY OF THE INVENTION

The present invention has been made in view of the above-described problems, an object thereof is to provide a technique of exhibiting an effect of removing captured substances through unbiased backwashing by causing a fluid to uniformly pass through a filter element over the entire length in an axial direction at the time of backwashing so as to efficiently rotate a captured-substance removal tool in a filtration unit which includes a tubular filter element and the captured-substance removal tool disposed along the axial direction inside the filter element and axially supported to be rotatable.

In order to achieve the above-described object, a filtration unit according to the present invention is characterized by including: a hollow tubular filter element which includes a tubular filter medium wall and causes a fluid to bidirectionally flow among a fluid inlet and outlet port provided at least at one end in an axial direction of the filter medium wall, an inside of the filter medium wall, and an outside of the filter medium wall; a captured-substance removal tool which is axially supported by a rotary shaft parallel with the axial direction to be rotatable inside the filter element and slidably contacting an inner surface of the filter medium wall during rotation; and a blade which is disposed on the fluid inlet and outlet port side inside the filter element and receives the fluid to rotate integrally with the captured-substance removal tool.

According to the present invention, it is possible to efficiently rotate the captured-substance removal tool by causing the fluid to uniformly pass through the entire length in the axial direction of the filter element during backwashing, thereby exerting the effect of removing captured substances through unbiased backwashing.

BEST MODE FOR CARRYING OUT THE INVENTION

Figure 1A:
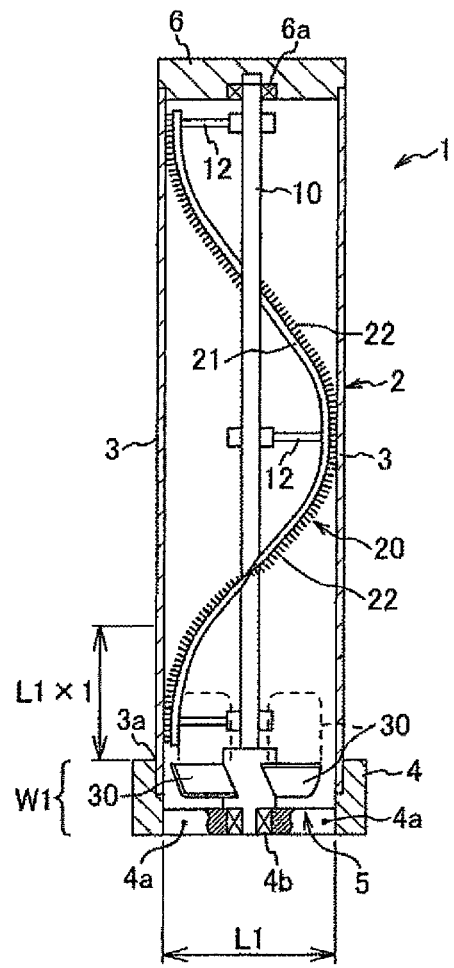
FIG. 1A is a longitudinal cross-sectional view of a filtration unit according to one embodiment of the present invention.

Hereinafter, the present invention will be described in detail with reference to embodiments illustrated in the drawings.

First Embodiment of Filtration Unit

Figure 1B:
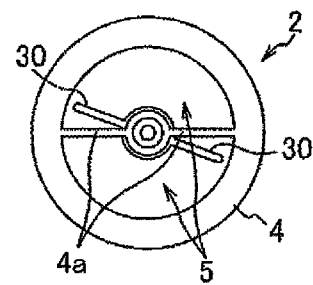
FIG. 1B is a bottom view thereof.

FIGS. 1A and 1B are a longitudinal cross-sectional view and a bottom view of a filtration unit according to one embodiment (first embodiment) of the present invention.

A filtration unit 1 includes: a hollow tubular filter element 2 which performs filtration by causing a fluid flowing into an inside from a fluid inlet and outlet port 5 provided at one end thereof to pass to an outside via a filter medium wall 3 provided at an outer circumference; a rotary shaft 10 which is configured to extend in parallel with an axial direction of the filter element inside the filter element 2 and to be rotatable; a captured-substance removal tool (scraper) 20 which is rotatable around the rotary shaft 10 and rotates slidably contacting an inner surface of the filter medium wall 3 of the filter element, and has at least a part thereof formed in a spiral shape; and a propeller 30 having two or more blades (blades) which are disposed on the fluid inlet and outlet port side and rotate integrally with the captured-substance removal tool.

One feature of the filtration unit 1 is to include: the hollow tubular filter element 2 which includes the tubular filter medium wall 3 and causes the fluid to bidirectionally flow among the fluid inlet and outlet port 5 provided at least at one end in the axial direction of the filter medium wall, the inside of the filter medium wall, and the outside of the filter medium wall; the captured-substance removal tool 20 which is rotatable around the rotary shaft 10 parallel with the axial direction inside the filter element and slidably contacts the inner surface of the filter medium wall during rotation; and the propeller (blade) 30 which is disposed on the fluid inlet and outlet port 5 side inside the filter element and integrally rotates the captured-substance removal tool by receiving the fluid.

Incidentally, the filter medium wall 3 may have a telescopic shape (the same diameter over the entire length in the axial direction) or a tapered shape (cone shape) of which diameter gradually decreases from the fluid inlet and outlet port side to the other end (closed end).

In the filtration unit 1, the propeller 30 formed of one or two or more blades (blades) rotated by the fluid passing through the fluid inlet and outlet port is fixed on the rotary shaft on the fluid inlet and outlet port 5 side of the captured-substance removal tool 20 fixed to the rotary shaft 10 which is configured to extend in parallel with the axial direction of the hollow tubular filter element 2 and to be rotatable. There is no limitation on a shape of the captured-substance removal tool 20, a shape, the number, and a position of the propeller. The propeller 30 can apply a large rotational force to the captured-substance removal tool by applying at least a rotational force using a backwashing fluid, which enters the inside from the outside of the filter medium wall 3 during backwashing and passes through the fluid inlet and outlet port 5.

The filter element 2 briefly includes: the filter medium wall 3 formed using a tubular filter medium; an end sleeve 4 which supports an outer circumference of an opening on one end side in the axial direction of the filter medium wall; and an another end member (end sleeve) 6 which is disposed at an opening on the other end side in the axial direction of the filter medium wall 3 and closes the opening. The fluid inlet and outlet port (first fluid inlet and outlet port) 5 is formed at one end (lower part) of the filter element 2, that is, at the end sleeve 4 and/or at a lower part of the filter medium wall 3.

In the present example, an outer circumference of the lower end of the filter medium wall 3 is covered by the end sleeve over a predetermined length in the axial direction so as not to effectively function as a filter medium, but the end sleeve 4 is not necessarily provided. In the case of adopting a support structure of the lower end of the filter medium wall without using the end sleeve, the lower end of the filter medium wall can function as the filter medium. In this case, the lower end opening of the filter medium wall serves as a fluid inlet and outlet port.

In the present embodiment (the same applies also to the other embodiments below), an axial range of the fluid inlet and outlet port 5 corresponds to an axial range W1 of the end sleeve 4.

That is, the filter element 2 has the fluid inlet and outlet port (first fluid inlet and outlet port) 5 as the opening at one end in the axial direction and the other end in the axial direction which is closed by the another end member 6, and the filter medium wall 3 is disposed formed using the tubular filter medium is disposed at the outer circumference of the filter element 2. Accordingly, the fluid flowing into the inside of the filter element 2 from the fluid inlet and outlet port 5 passes (penetrates) to the outside via the filter medium wall 3, and foreign substances in the fluid are captured by the inner wall of the filter medium wall 3 during passage of the fluid. In the case of backwashing, the backwashing fluid is supplied from the outside of the filter medium wall 3 to an inner side of the filter medium wall (caused to pass in a direction opposite to a filtering direction), whereby the captured substances adhering to the inner surface of the filter medium wall are detached and discharged from the fluid inlet and outlet port 5 as drain.

Both ends in the axial direction of the rotary shaft 10 are axially supported to be rotatable. In the present example, one end and the other end are axially supported by a bearing portion 4*b* provided on the fluid inlet and outlet port 5 side and a bearing portion 6*a* provided on another end member 6, respectively, to be rotatable. For example, a bracket 4*a* having a small width in a diametrical direction extends at the fluid inlet and outlet port 5, and a bearing portion 4*b* is provided at a center portion of the bracket 4*a*. The fluid inlet and outlet port 5 is formed by an opening portion which avoids the bracket 4*a*.

A shape, an inclination angle, the number or the like of the propeller (blade) 30 fixed to the rotary shaft 10 is selected such that the propeller is rotated by the backwashing fluid flowing out of the fluid inlet and outlet port 5 during backwashing. Although the backwashing fluid which has entered the inside of the filter element 2 via the filter medium wall 3 during backwashing is discharged from the fluid inlet and outlet port 5, the propeller is rotated by the backwashing fluid passing through the fluid inlet and outlet port 5 by providing the propeller 30 inside the fluid inlet and outlet port, and as a result, the captured-substance removal tool 20 is integrally rotated.

Incidentally, it may be configured such that the rotary shaft 10 is supported by the bracket 4*a* and the another end member 6 so as to be non-rotatable, the captured-substance removal tool 20 is assembled to be rotatable with respect to the rotary shaft 10 which does not rotate, and the propeller 30 is fixed to the captured-substance removal tool 20 to be integrally rotated. In the present specification, the term "rotatable about the rotary shaft" includes both the case where the rotary shaft integrally rotates with the captured-substance removal tool and the propeller and the case where the rotary shaft is fixed and only the captured-substance removal tool and the propeller rotate. Further, the rotary shaft may be configured to penetrate the entire length in the axial direction of the filter element or may be configured to be disposed only on the end side in the axial direction of a rotating body formed of the captured-substance removal tool and the propeller.

A flow amount of the backwashing fluid inside the filter element 2 decreases as separating from the fluid inlet and outlet port 5 of the filter element, but the flow amount is the highest inside the fluid inlet and outlet port 5 and an immediately upstream side (upper side in FIG. 1A) thereof. Accordingly, it is possible to efficiently rotate the captured-substance removal tool 20 by disposing the propeller in the region having the fluid inlet and outlet port at the center thereof.

Accordingly, an area of the propeller 30 that receives the fluid preferably falls within a range as wide as not to interfere with the flow, may be contained within the fluid inlet and outlet port 5 so as not to interfere with the filter medium wall 3 as indicated by the solid line, and may be overlapped on the captured-substance removal tool 20 side or the lower part of the filter medium wall 3 as indicated by the one-dot dashed line in FIG. 1A. Alternatively, the area may partially project to the outer side (lower side) of the fluid inlet and outlet port 5 (end sleeve 4) as long as there is no interference with another member disposed outside the fluid inlet and outlet port 5.

The propeller 30 includes at least one blade and preferably two or more blades. The propeller is provided at a position through which most (70% or more) or the entire of the backwashing fluid flowing from the filter medium wall 3 passes. Accordingly, the propeller is disposed in the region having the fluid inlet and outlet port 5 at the center thereof in the present example, but the propeller may be disposed such that a part or the entire propeller overlaps the lower end of the filter medium wall as indicated by the broken line in FIG. 1A.

Further, a part of the captured-substance removal tool 20 may be used also as the propeller, or the captured-substance removal tool 20 and the propeller may be integrally connected together as will be described later.

According to an experiment, the most suitable axial range for disposing the propeller (blade) 30 is the fluid inlet and outlet port 5 and a region at the upper side of the fluid inlet and outlet port 5 (upstream side during backwashing) while not interfering with the lower part of the captured-substance removal tool, that is, within the axial range W1. However, it has been found out that the propeller effectively functions even if the entire propeller (blade) is disposed inside a region exceeding the axial range W1 (within the effective range of the filter medium wall) or a part of the propeller is disposed inside the region. Specifically, when an inner diameter of the fluid inlet and outlet port 5 (an inner diameter of the end sleeve 4 or the filter medium wall 3) is L1, there is the effect of rotating the captured-substance removal tool 20 even in a configuration in which the entire or a part of the blade of the propeller is positioned in a range having a distance of L1×1 from an effective end (an end of the region that can effectively function as the filter medium) 3*a* of the filter medium wall 3. As the blade is present at least in a part within this range, the propeller rotates by receiving the fluid without causing the resistance against flow in a discharge direction of the backwashing fluid, and it is possible to promote inflow of the backwashing fluid from the filter medium wall at a position that is the farthest from the fluid inlet and outlet port 5 and discharge of the backwashing fluid from the from the fluid inlet and outlet port 5. Accordingly, an axial range, indicated by the broken line in FIG. 1A, in which the overlap of the blades is allowed includes the range of L1×1 from the effective end 3*a* of the filter medium wall in addition to the axial range W1 inside the opening of the end sleeve 4, (which applies similarly to all the following embodiments).

In other words, when the inner diameter of the filter medium wall 3 is L1, at least a part of the blade forming the propeller 30 may be positioned within the axial range of the distance of L1×1 from the effective end (the end of the region that can effectively function as the filter medium) 3a of the filter medium wall 3.

Incidentally, the position at which an inner diameter portion of the blade is attached to the rotary shaft 10 is not necessarily within the axial range W1 of the fluid inlet and outlet port. Although the inner diameter portion of the blade is positioned outside the fluid inlet and outlet port, it may be enough if a main blade-like portion that generates the rotational force when receiving the fluid is positioned within THE axial RANGE W1 of the fluid inlet and outlet port and/or on the upstream side (upper side) thereof.

In the case where a part of the blade is positioned within the range (at the inner side) of the filter medium wall 3 that effectively functions as the filter medium, it may be configured such that a bristle portion is provided on an outer circumferential edge of the relevant portion of the blade to remove captured substances adhering to the filter medium wall to be capable of being deployed in the fluid.

Next, the captured-substance removal tool 20 according to the present example includes an elongated spiral member (elastic coil member) 21 which is spirally assembled with the rotary shaft 10 extending in the axial direction in the state of being separated apart from the rotary shaft (state of forming a space with respect to the rotary shaft) and a bristle portion (brush portion) 22 implanted at an edge on an outer circumferential side of the spiral member.

When a resistance of rotation of the spiral captured-substance removal tool 20 increases due to dust captured by the filter medium wall during backwashing, an outer diameter of the spiral member is tightened (reduced in diameter) to easily rotate by matching a rotation direction of the propeller with a winding direction of the spiral member. If a material of the spiral member has a spring property, a rubbing state (contact state) of the spiral member (bristle portion) with the filter wall portion returns to an original state as the rotation of the captured-substance removal tool becomes smooth due to the removal of the dust on the filter medium wall, and the removal of the dust is performed without a decrease in rotational speed due to the resistance of the dust or stopping of the rotation. At this time, it is possible to more effectively realize reduction in diameter (contraction) of the spiral member by making the support member 12, which supports the captured-substance removal tool, have a spring property. Incidentally, the rotation direction of the captured-substance removal tool during filtration is a direction (diameter-expansion direction) of causing the spiral member to be radially inflated, and thus, a sliding resistance with respect to a surface of the filter medium wall becomes large and the captured-substance removal tool does not rotate.

The spiral member 21 is integrated with the rotary shaft by the support member 12 projecting from the rotary shaft 10 in an outer diameter direction, and a wide space serving as a fluid flow space (flow path) is secured between the rotary shaft and the spiral member. In addition, the spiral-shaped flow path formed between the rotary shaft 10 and the spiral member 21 is configured to have a uniform width over the entire length in the axial direction and not to hinder flow of the captured substances that have been peeled off. Thus, the captured substances are effectively dispersed in the backwashing fluid and conveyed.

As the support member 12 is configured to be elastically deformable, it is possible to smoothly perform the reduction or expansion in diameter of the spiral member 21 as described above.

The bristle portion (removal member) 22 removes the captured substances adhering to the entire inner surface of the filter medium wall by moving while slidably contacting the inner surface of the filter medium wall in the course of rotation of the spiral member 21 around the rotary shaft. In the case where the filter hole is an elongated hole extending in the axial direction, it is possible to efficiently remove the captured substances by the rotation of the spiral member 21. In addition, since the filter element 2 is the filter element having the tubular or cone shape using the wedge wire or the notch wire, it is possible to efficiently remove the captured substances by the bristle portion moving along the filter hole without being disturbed by the member such as the wire forming the filter hole even if the filter hole is a long hole extending in the circumferential direction or another direction crossing the axial direction.

Incidentally, a porous cleaning object having irregularities on a surface thereof, such as the filter medium, has an excellent removal effect obtained by the bristle portion (brush). However, the removal member is not limited to the bristle portion, and a removal member made of metal, resin or rubber, which is configured in the form of a blade or a spatula (scraper), may be used.

When the captured-substance removal tool 20 is configured and disposed so as to be able to remove the captured substances by rubbing the inner surface of the filter medium wall without leaking over the entire length in the axial direction and the circumferential direction when rotating like a spiral shape, it is possible to peel off and remove the captured substances adhering to the entire surface of the inner wall of the filter element by the bristle portion 22. Such a shape is also preferable for securing a weight balance during rotation.

Second Embodiment of Filtration Unit

Figure 2A:
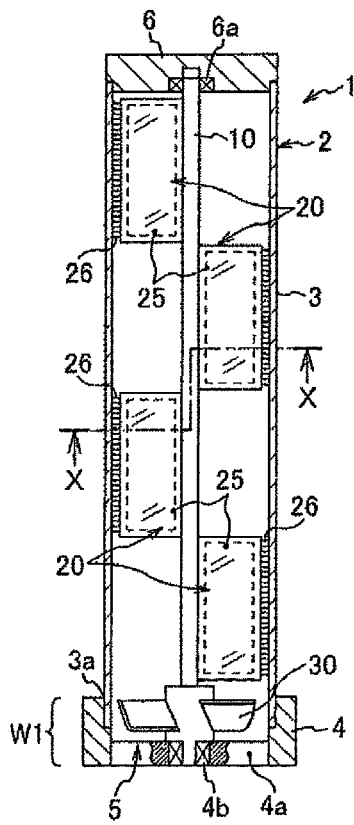
FIGS. 2A and 2B are longitudinal cross-sectional views of a filtration unit according to a modified embodiment.
Figure 2B:
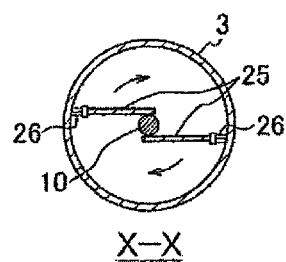

Next, FIGS. 2A and 2B) are a longitudinal cross-sectional view and a cross-sectional view taken along line X-X of the filtration unit 1 according to another embodiment of the present invention.

The captured-substance removal tool 20 is not necessarily formed in the spiral shape, but the captured-substance removal tool 20 may be configured using a plurality of flat plate-shaped blade members 25, as in the modified embodiment of FIG. 2(a), for example, such that positions in the axial direction and positions in the circumferential direction of the respective blade members 25 are made different from each other. This is because it is possible to peel off and remove the adhering captured substances by slidably rubbing the inner wall of the filter element over the entire length in the axial direction and the entire surface in the circumferential direction without losing rotational balance. A bristle portion 26 is formed at an edge on an outer diameter side of the blade member 25.

In the case where the blade member 25 has the plate shape as illustrated in the drawing, an area and rigidity of the blade member cause a resistance during rotation, and thus, it is possible to expect an effect that rotational speed is reduced.

In the case where the blade member 25 is made of a rigid plate material, there is concern that the rotation of the captured-substance removal tool 20 is hindered by the resistance during rotation generated between the blade member 25 and the fluid or the resistance from the captured substances adhering to the filter medium wall 3. Thus, if the blade member is configured solely of a frame body so as to form an annular body (a configuration in which an inside except for the frame body along an outer circumferential edge is formed as an opening, which is indicated by the broken line in the drawing), it is possible to configure the entire blade member to be elastically deformable by imparting a spring property thereto. Thus, even if the rotation of the captured-substance removal tool 20 is obstructed by various resistances it is possible to maintain and recover the original rotational speed of the captured-substance removal tool by absorbing and mitigating the resistances as the blade member 25 is bent and deformed. Incidentally, the blade member 25 may be configured using the plate material when it is possible to elastically deform the blade member 25 by devising a material to be used, rigidity, a plate thickness or the like even in the case of not adopting the configuration in which only the frame body is provided. For example, a mesh-like plate material or a plate material formed with punching may be used.

Further, each of the blade members 25 is elastically deformed in the circumferential direction and easily rotates by fixing one surface of a base end of each of the blade members 25 having a different position in the axial direction to an outer circumferential surface of the rotary shaft 10, as illustrated in FIG. 2B, when the rotary shaft rotates in an arrow direction. Further, when the rotary shaft rotates in the opposite direction of the arrow, it is difficult for each of the blade members to be elastically deformed so that the resistance between the blade member and the inner surface of the filter medium wall 3 increases and becomes the resistance against the rotation.

Third Embodiment of Filtration Unit

Figure 3:
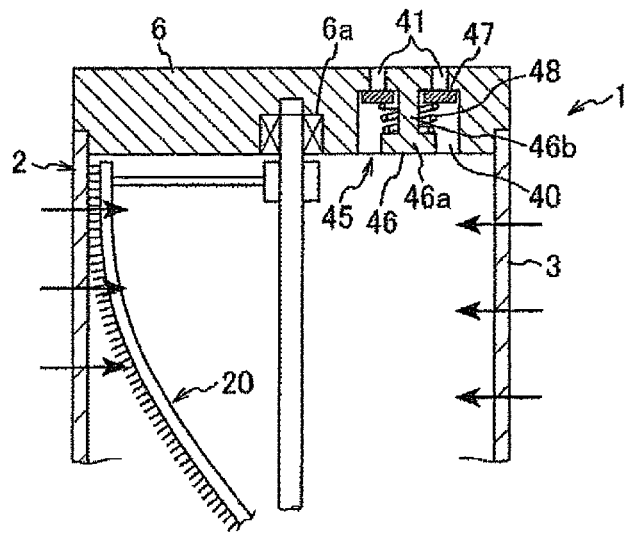
FIG. 3 is a longitudinal cross-sectional view of a main part of the filtration unit according to the modified embodiment.

Meanwhile, when the fluid inlet and outlet port 5 is provided only at one end in the axial direction of the filter element 2 as illustrated in FIGS. 1A and 1B, there is concern that the flow amount of the backwashing fluid flowing to another end member 6 side at the other end in the axial direction during backwashing decreases, and the dispersion of the captured substances, which have been peeled off from the inner surface of the filter medium wall, into the fluid becomes insufficient. As a countermeasure against this, it is effective to provide a check valve 45 that operates only during backwashing to open a through hole 41 provided in the another end member 6 as illustrated in FIG. 3.

That is, for example, the another end member 6 which closes the other end of the filter element 2 includes a recess 40 formed in the inner surface thereof and the through hole 41 penetratingly formed in a top surface of the recess. The check valve 45 includes: a guide member 46 which is provided to project downward from the center of the through hole 41 (the top surface of the recess) in the state of not closing the through hole 41 and has a stopper 46a at a lower end; an annular valve body 47 which is guided so as to be vertically movable by inserting a center hole thereof in the outer circumference of a small-diameter portion 46b of the guide member 46; and an elastic member 48 which is disposed between the stopper portion 46a and the valve body 47 to perform biasing upward such that the valve body 47 closes the through hole 41. The through hole 41 has a portion that penetrates the top surface of the recess except for a connecting piece (not illustrated) which connects an upper part of the guide member 46 and the another end member 6 (the inner circumference of the through hole).

The valve body 47 closes the through hole 41 by being pressed upward by pressure of the fluid and the elastic member 48 having a small spring force at the time of filtration in which the fluid flows in from the fluid inlet and outlet port 5, but opens the through hole 41 by being pressed by an external pressure and moving downward against biasing of the elastic member 48 at the time of backwashing in which the pressure outside (on a primary side) of the filter element becomes higher than the internal (secondary side) pressure. The valve body 47 rises by the internal pressure of the filter element to close the through hole 41 during filtration, and thus, continuously opens the through hole even if there is no biasing by the elastic member 48, but the elastic member is provided in order to make the operation of the valve body reliable.

When the through hole 41 is opened during backwashing, a part of the backwashing fluid flowing in from the outside of the filter medium wall flows out upward from the through hole 41, that is, in a direction opposite to the direction toward the fluid inlet and outlet port 5. Thus, it is possible to increase an outflow amount of the backwashing fluid on the another end member 6 side where an entry flow amount of the backwashing fluid is likely to decrease and to effectively disperse the captured substances detached from the filter medium wall in the backwashing fluid.

Fourth Embodiment of Filtration Unit

Figure 4:
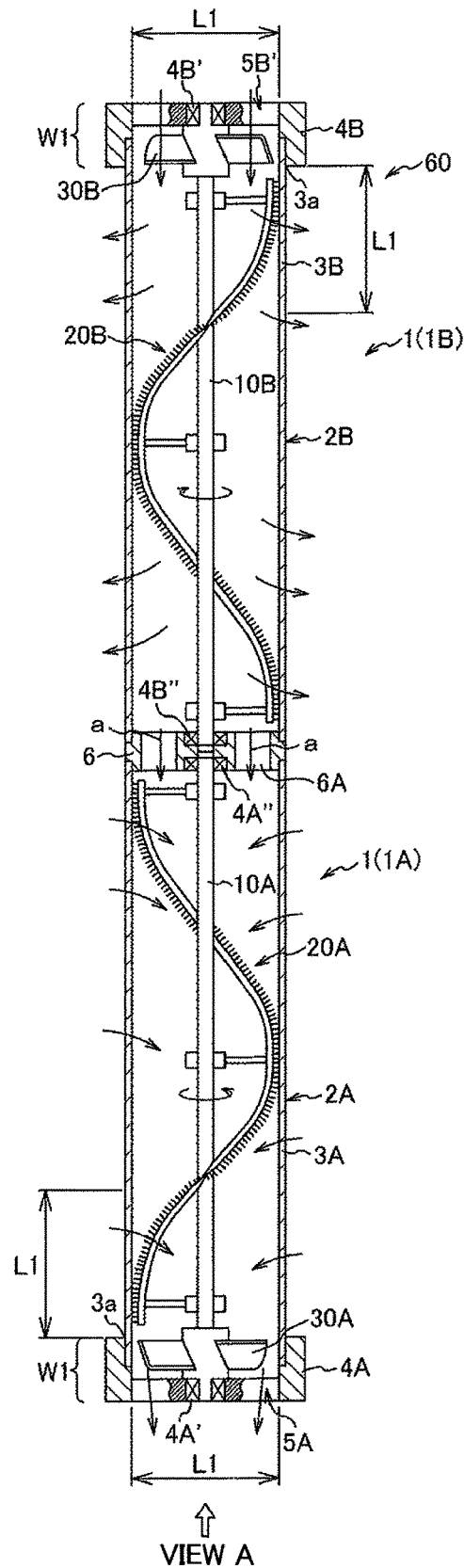
FIG. 4 is a longitudinal cross-sectional view of a filtration unit according to another embodiment of the present invention.
Figure 5:
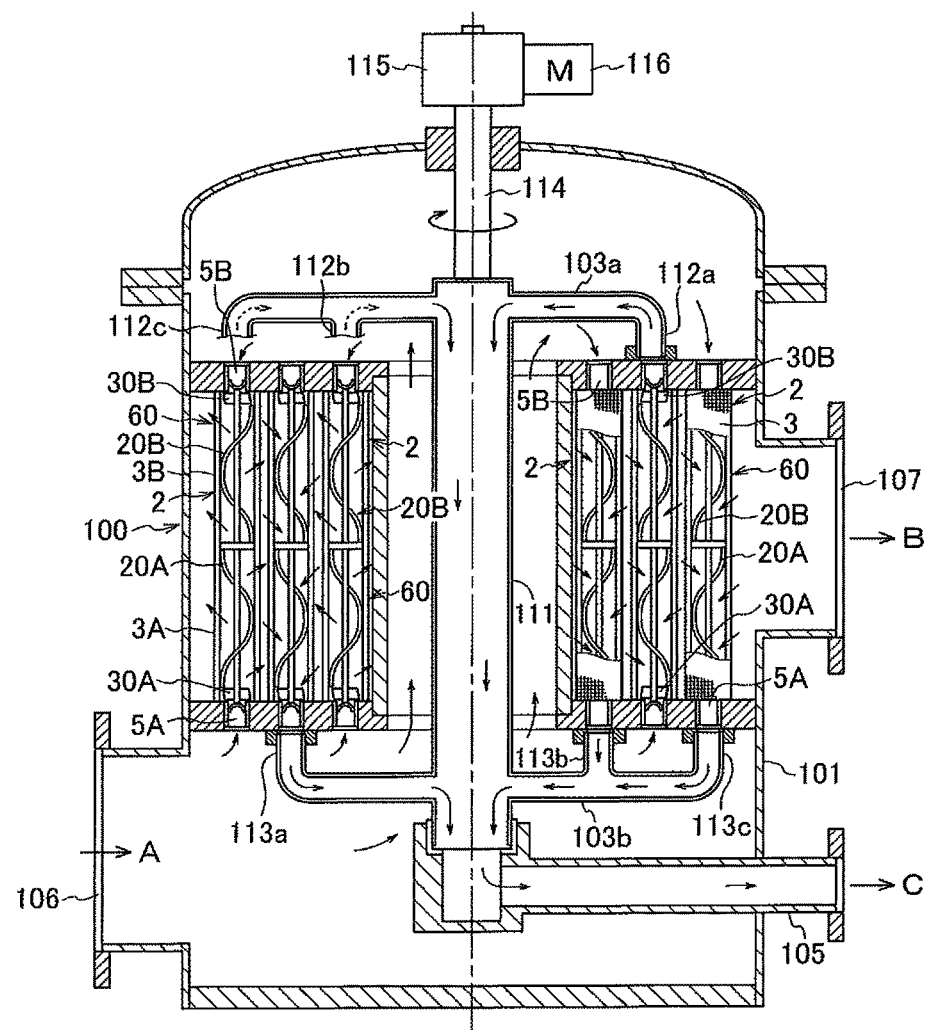
FIG. 5 is a cross-sectional view illustrating a configuration of a filtration device suitable for the filtration unit of FIG. 4.

Next, FIG. 4 is a longitudinal cross-sectional view of a filtration unit according to another embodiment of the present invention, and FIG. 5 is a cross-sectional view illustrating a configuration of a filtration device suitable for this filtration unit.

Both ends of the filter element 2 are opened in this filtration unit 60 so as to be capable of being applied to a filtration device 100 illustrated in Patent Document 2 in which filtration and backwashing are performed from openings at both the ends of the tubular filter element.

The filtration device 100 illustrated in FIG. 5 includes: a casing 101 which has a fluid inlet 106 through which a fluid is introduced from an outside and a fluid outlet 107 through which the fluid filtered inside is discharged; a plurality of tubular filter elements 2 (2A, 2B) which are concentrically disposed inside the casing and performs filtration when the fluid passes from an inner side to an outer side of the tubular filter medium wall 3 with both opened ends; the filtration unit 60 which includes captured-substance removal tools 20 (20A, 20B), propellers 30 (30A, 30B), and the like; backwashing pipes 103a and 103b which are connected to the openings of both ends of each filter element at each different timing and perform backwashing by causing the fluid flow from the outer side to the inner side of the filter medium wall 3; a backwashing fluid drain pipe 105 which is connected to a discharge side of the backwashing pipe and discharges captured substances, removed by the captured-substance removal tool rotating by flow of the fluid during backwashing, to the outside of the casing, and the like.

A lower end of a shaft 114 is fixed to an upper end of a discharge pipe 111 to which the upper backwashing pipe 103a is connected, and a gear box 115 is provided at an upper end of the shaft 114 and is rotationally driven by a motor 116. The backwashing pipe 103a rotates in one direction via the shaft 114 by rotationally driving the motor 116, and backwashing nozzles 112a, 112b and 112c of the backwashing pipe 103a are sequentially connected to upper openings of the plurality of filter elements 2 which are concentrically disposed. At the same time, the lower backwashing pipe 103b also rotates, and the backwashing nozzles 113a, 113b and 113c of the backwashing pipe 103b are sequentially connected to lower end openings of the plurality of filter elements 2.

In the filtration device 100, an object fluid flows from the fluid inlet 106 as indicated by an arrow A, flows from the openings at both the ends (the upper end and the lower end) of each of the filter elements 2, and is filtered while passing through the filter element 2 from the inner side to the outer side during filtration. The fluid that has passed through the filter element 2 and filtered flows out to the outside from the fluid outlet 107 as indicated by an arrow B.

During backwashing, the motor 116 is rotationally driven to rotationally move the backwashing pipes 103a and 103b to be connect to the openings at the upper end and the lower end of each of the filter elements 2 at different timings, and the fluid flows from the outer side toward the inner side of the filter element 2 due to a pressure difference between the inner side and the outer side and performs backwashing. The captured substances removed by backwashing are introduced into the discharge pipe 111 and discharged from a discharge port of the backwashing fluid drain pipe 105 to the outside as indicated by an arrow C.

Incidentally, the backwashing nozzle on the first backwashing pipe 103a side and the backwashing nozzle on the second backwashing pipe 103b side are not simultaneously connected to the openings at the upper end and the lower end of the specific filter element 2.

In FIG. 5, the backwashing nozzles 113b and 113c are connected to the lower end openings of the two filter elements 2 on the right side of the discharge pipe 111 and the backwashing nozzle 112a is connected to the upper opening of one filter element at the center on the right side, thereby, forming a state where backwashing is possible.

Incidentally, while the backwashing nozzle is connected to one end opening of a specific filter element and backwashing is performed, another end opening of the filter element may be closed by a closing member (not illustrated).

In addition, the backwashing nozzle is not connected to the upper and lower end openings of the other two filter elements excluding the filter element at the center on the left side of FIG. 5, thereby forming a state where filtration is possible. Since the backwashing nozzle 113a is connected to the lower end opening of the filter element at the center on the left side, backwashing is possible in this state.

FIG. 4 is the cross-sectional view illustrating a configuration of the filtration unit 60 that can be applied to the filtration device 100.

In the filtration unit 60 according to this embodiment, the two filtration units 1 (1A, 1B) according to FIGS. 1A and 1B having both the opened ends in the axial direction are connected in series by connecting another end openings (another end member 6) in the axial direction, and each inside of the filter elements 2A and 2B is in a communicating state via the through hole 6A or the like formed on the another end member 6 side.

In other words, the filtration unit 60 has the configuration of being connected in series in the communicating state such that fluid inlet and outlet ports 5A and 5B (another end openings in the axial direction) of the two filter elements 2A and 2B of which both ends in the axial direction are opened are positioned at both the ends in the axial direction.

The another end member 6 of each of the filtration units 1A and 1B is eliminated, or the through hole 6A is formed in the another end member 6 such that internal spaces of the filter elements 2A and 2B forming both the filtration units communicate with each other.

A characteristic configuration of the filtration unit 60 is that the propellers 30A and 30B can rotate in opposite directions from each other when viewed from the same direction (for example, in an axially downward direction A) so as to make each of the rotary shafts 10A and 10B rotate independently.

One end of each of the rotary shafts 10A and 10B is axially supported by bearings 4A' and 4B', provided on each side of the fluid inlet and outlet ports 5A and 5B, to be rotatable, and further, the other end thereof is axially supported by bearings 4A" and 4B", positioned at a boundary between both the filter elements 2A and 2B to be rotatable.

The bearings 4A" and 4B" are supported by a plurality of narrow brackets which radially extend in a radial direction so as not to close the through hole 6A.

Thus, the backwashing fluid flowing into the filter element 2A at the time of backwashing of the one filter element 2A corresponding to the lower half of the filtration unit 60 rotates the propeller 30A to rotate the captured-substance removal tool. Accordingly, it is possible to efficiently remove the captured substances adhering on the filter medium wall 3A over the entire inner circumferential surface and to cause the captured substances that have been removed to be efficiently deployed into the backwashing fluid and discharged from the first fluid inlet and outlet port 5A. Particularly, it is possible to lead the backwashing fluid to the first fluid inlet and outlet port 5A to be discharged by causing the backwashing fluid, which hardly flows in from the upper end side of the filter medium wall 3A and is likely to remain even if flowing in therefrom, to efficiently flow.

In addition, the other filter element 2B corresponding to the upper half of the filtration unit 60 has a configuration in which the one filter element 2A is inverted upside down.

That is, the backwashing fluid flowing into the filter element 2B at the time of backwashing of the filter element 2B rotates the propeller 30B to rotate the captured-substance removal tool. Accordingly, it is possible to efficiently remove the captured substances adhering on the filter medium wall 3B over the entire inner circumferential surface and to cause the captured substances that have been removed to be efficiently deployed into the backwashing fluid and discharged from the second fluid inlet and outlet port 5B. Particularly, it is possible to lead the backwashing fluid to the second fluid inlet and outlet port 5B to be discharged by causing the backwashing fluid, which hardly flows in from the lower end side of the filter medium wall 3B and is likely to remain even if flowing in therefrom, to efficiently flow.

It is a matter of course that conditions such as an inclination direction, a shape, and the like of each blade forming each of the propellers 30A and 30B are set such that it is possible to cause the backwashing fluid inside the filter elements to flow out from each of the first fluid inlet and outlet port 5A and the second fluid inlet and outlet port 5B. Accordingly, the illustrated configuration example is only an example.

Incidentally, a flow amount of the backwashing fluid is extremely low at the end of the filter element close to the another end member 6 at the time of performing backwashing of any of the filter elements 2A and 2B in FIG. 4. Thus, the backwashing fluid in this region does not contribute to each rotation of the captured-substance removal tools 20A and 20B. On the other hand, a flow rate and a flow amount of the backwashing fluid in a region in the vicinity of each of the fluid inlet and outlet ports 5A and 5B are the maximum, and the backwashing fluid with the fast flow rate rotates each of the propellers 30A and 30B. A rotational force of each captured-substance removal tool is derived from the propeller which is rotated by the high-speed backwashing fluid which seems to flow only from the respective fluid inlet and outlet ports 5A and 5B instead of the backwashing fluid flowing into the periphery of the another end member 6.

Incidentally, a source of the rotational force of the propeller rotating by the backwashing fluid is the pressure difference between the inside of the filter element and each inside of the backwashing pipes 103a and 103b.

Next, when the device configuration of the filtration device 100 and an operating sequence of the respective backwashing pipes are appropriately modified in the case of applying the filtration unit 60 of FIG. 4 to the filtration device 100, it is possible to individually operate the upper and lower filtration units 1A and 1B in an independent manner such that one filtration unit performs backwashing while the other filtration unit performs filtration. That is, for example, the pressure difference between the inside and the outside of each filtration unit is adjusted such that the propeller 30B of the upper filtration unit 1B is rotated in a direction for filtration when the propeller 30A of the lower filtration unit 1A is rotated in a direction for backwashing. In this case, the fluid flowing into the upper filter element 2B from the fluid inlet and outlet port 5B flows into the lower filter element 2A via the through hole 6A (arrow a) and greatly contributes to improvement of a cleaning effect.

Incidentally, the through hole 6A is unnecessary when the upper and lower filter elements 2A and 2B perform backwashing at the same time, but there is no problem as long as the through hole 6A having a small opening area is provided. In this case, the through hole 6A having the small opening area plays a role of removing foreign substances to be deposited in this portion.

Although the case of applying the filtration unit 60 to the filtration device 100 has been described as above, the filtration unit 60 can also be applied to other filtration devices having a different configuration from the filtration device 100.

For example, in the case of adopting a device configuration in which backwashing fluids flowing into the two filter elements 2A and 2B, respectively, from the outside during backwashing are led to the one fluid inlet and outlet port 5A to be discharged, it may be configured such that the respective propellers 30 and 52 are rotated in the same direction so as to cause the backwashing fluid to be sucked from the second fluid inlet and outlet port 5B and to be discharged from the first fluid inlet and outlet port 5A. In this case, the rotary shafts 10A and 10B may be integrated such that the respective propellers 30 and 52 always rotate in the same direction (to be described later in an embodiment of FIG. 6).

Incidentally, the axial range most suitable for disposing the propellers (blades) 30A and 30B in the filtration unit 60 is set to the range of L1×1 from the effective end 3a of the filter medium wall in addition to the axial range W1 inside the openings of end sleeves 4A and 4B as illustrated in FIGS. 1A and 1B.

Fifth Embodiment of Filtration Unit

Figure 6:
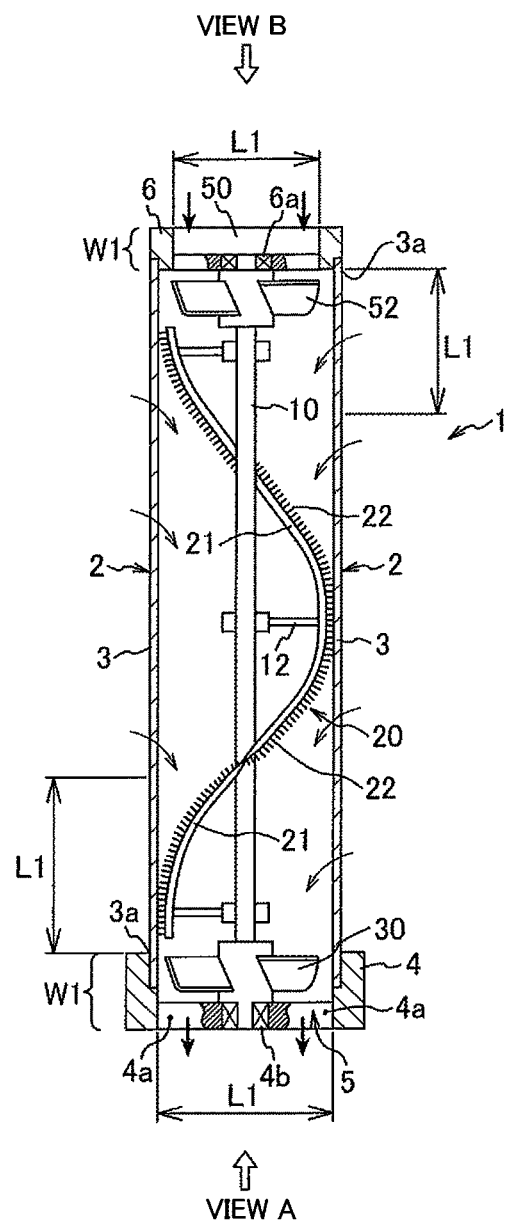
FIG. 6 is a longitudinal cross-sectional view illustrating a configuration of a filtration unit according to another embodiment having a fluid inlet and outlet port at both ends.

Next, FIG. 6 is a longitudinal cross-sectional view illustrating a configuration of a filtration unit according to another embodiment which includes fluid inlet and outlet ports at both ends.

A characteristic configuration of the filtration unit 1 is that an opening as a second fluid inlet and outlet port 50 is also provided on the another end member 6 side in the configuration example of FIGS. 1A and 1B, and a second propeller 52 is provided at an end side of the rotary shaft 10 positioned on the second fluid inlet and outlet port 50 side.

Each inclination direction (shape) of blades, which form the first and second propellers 30 and 52 fixed to both ends of the one rotary shaft 10, respectively, is set such that both the propellers rotate in the same direction when receiving a backwashing fluid and the rotation of one propeller is not disturbed by the other propeller. For example, when the first propeller 30 rotates in the counterclockwise direction as viewed from the first fluid inlet and outlet port 5 (view A) side by the backwashing fluid flowing toward the first fluid inlet and outlet port 5, the inclination direction of the blade of the second propeller 52 is set to rotate in the counterclockwise direction (the same direction) as viewed from the first fluid inlet and outlet port 5 side by the backwashing fluid entering the inside from the second fluid inlet and outlet port 50.

In such a configuration, when the one propeller 30 rotates in a direction to discharge the backwashing fluid from the first fluid inlet and outlet port 5, the other propeller 52 functions to enhance fluidity (flowability) of the entire flow path inside the filter element by rotating in a direction to introduce the external backwashing fluid from the second fluid inlet and outlet port 50. In this case, the fluid inlet and outlet port 50 functions only as a fluid inlet.

As described above, the fluid inlet and outlet ports 5 and 50 are provided at both the ends of the filtration unit 1, and the propellers 30 and 52, which rotate integrally with the captured-substance removal tool 20, are provided at the position close to both ends in the axial direction of the filter element (filter medium wall) in the present embodiment. Thus, the backwashing fluid flowing into the inside from the outside of the filter medium wall 3 during backwashing can efficiently remove the captured substances by rotating the captured-substance removal tool, and further, efficiently discharge the captured substances that have been removed from one of the fluid inlet and outlet ports by improving the fluidity of the backwashing fluid over the entire length in the axial direction inside the filter element.

Figure 7:
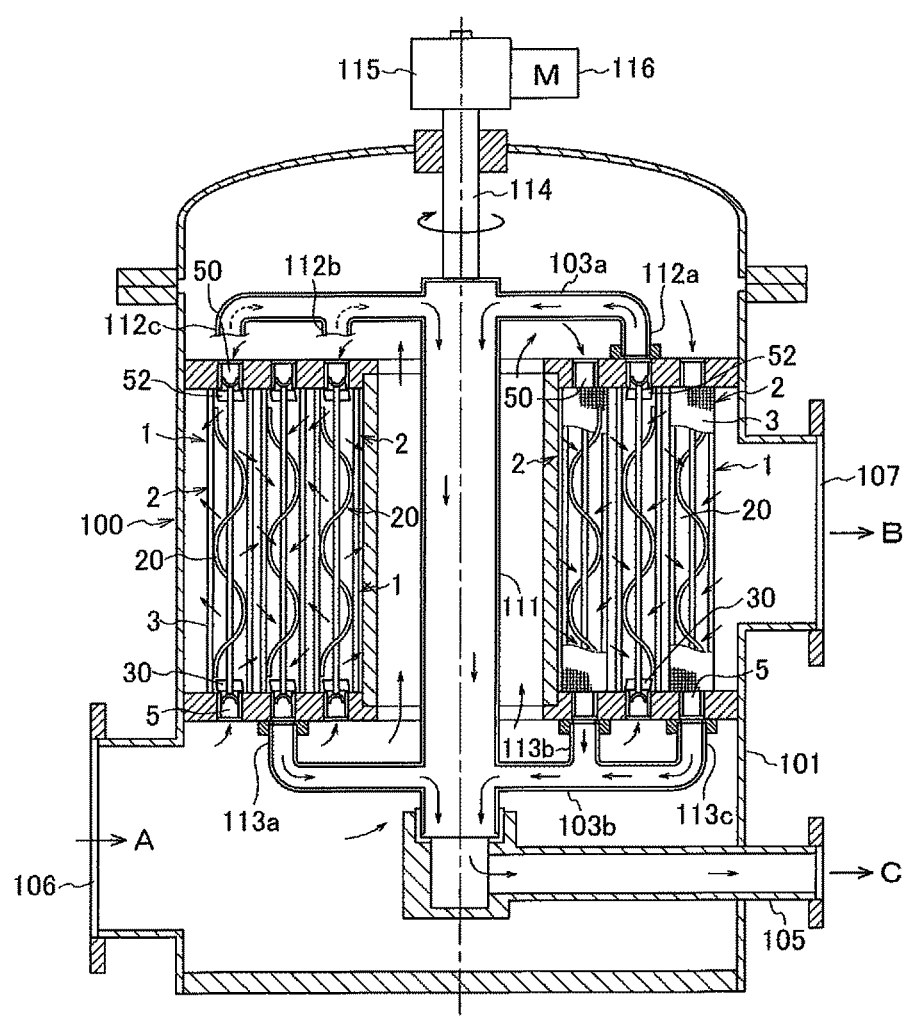
FIG. 7 is a longitudinal cross-sectional view illustrating a state where a filtration unit 1 of FIG. 6 is applied to a filtration device 100 illustrated in FIG. 5.

FIG. 7 is a longitudinal cross-sectional view illustrating a state where the filtration unit 1 of FIG. 6 is applied to the filtration device 100 illustrated in FIG. 5.

In this case, when the backwashing fluid flowing into the inside from the outside of the filter medium wall 3 during backwashing is discharged from the first fluid inlet and outlet port 5, both the propellers 30 and 52 rotate in the counterclockwise direction viewed from an axial direction A side in FIG. 6. In this case, the other propeller 52 operates to introduce the external backwashing fluid from the second fluid inlet and outlet port 50 into the filter element and to send the introduced backwashing fluid to the first fluid inlet and outlet port 5.

In addition, when the backwashing fluid flowing into the inside from the outside of the filter medium wall 3 is discharged from the second fluid inlet and outlet port 50, both the propellers 30 and 52 rotate in the counterclockwise direction as viewed from an axial direction B side in FIG. 6. In this case, the propeller 30 operates to introduce the external backwashing fluid from the first fluid inlet and outlet port 5 into the filter element and to send the introduced backwashing fluid to the second fluid inlet and outlet port 50.

However, it is not allowed to implement backwashing by simultaneously connecting backwashing nozzles of the respective backwashing pipes 103a and 103b to both end openings of a specific filter element. At the time of backwashing a specific filter element, the backwashing nozzle is connected only to any one of the end openings.

The captured-substance removal tool 20 is formed in a coil shape so as not to hinder the fluidity of the fluid inside the filter element, and a winding direction of the coil is configured such that a diameter thereof decreases due to rotation caused when the backwashing fluid is discharged from either the first fluid inlet and outlet port side or the second fluid inlet and outlet port side. Although the illustrated captured-substance removal tool 20 is integrated over the entire length in the axial direction, it may be configured such that a plurality of short captured-substance removal tools are individually attached to the rotary shaft. This also applies to other embodiments.

In the configuration of the filtration unit 1 in which the fluid inlet and outlet ports are provided at both the ends in the axial direction of the filter element and the propellers 30 and 52 are provided at both the ends of the one rotary shaft as illustrated in FIG. 6, the captured-substance removal tool 20 does not rotate since the rotational force thereto is canceled if the filtration fluid flows into the filter element simultaneously from both the fluid inlet and outlet ports 5 and 50. In addition, an outer diameter of the captured-substance removal tool as the coil is enlarged when the captured-substance removal tool does not rotate during filtration, and thus, the resistance between the captured-substance removal tool and the inner surface of the filter medium wall increases, whereby the rotation is further hindered.

Incidentally, the axial range most suitable for disposing the propellers (blades) 30 and 52 in the filtration unit of FIG. 6, the end sleeve 4, the another end member (end sleeve) 6 is the range of L1×1 from the effective end 3a of the filter medium wall in addition to the axial range W1 inside the openings of the end sleeve 4 and the another end member (end sleeve) 6 as illustrated in FIGS. 1A and 1B.

<Application Example of Filtration Unit to Other Filtration Devices>

Figure 8:
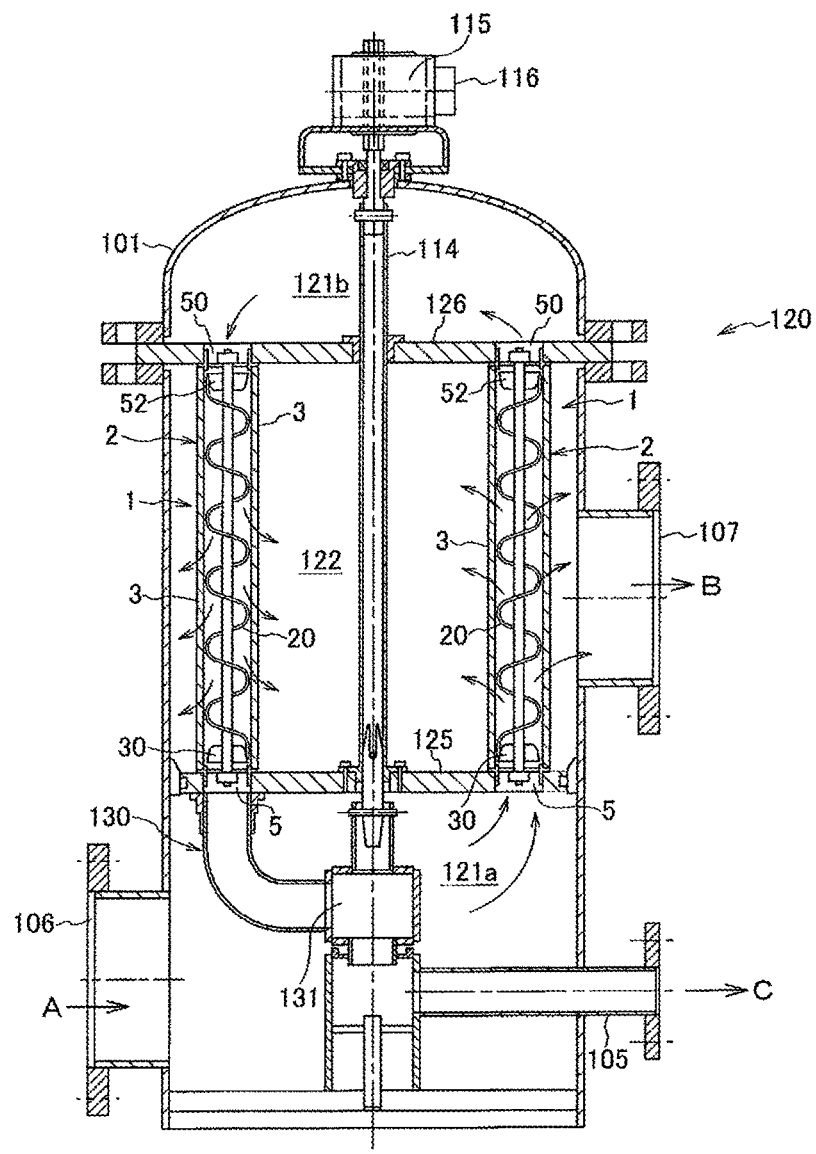
FIG. 8 is a diagram illustrating a configuration of a filtration device 120 according to Japanese Patent Application No. 2014-134510 (JP 2016-010788 A).

FIG. 8 illustrates a configuration of a filtration device 120 according to Japanese Patent Application No. 2014-134510 (JA No. 2016-010788 A) relating to the proposal of the present applicant, and the filtration unit 60 of FIG. 4 can also be applied to this filtration device 120.

In addition, the filtration unit 1 of FIG. 6 can also be applied to the filtration device 120.

FIG. 8 is a cross-sectional view illustrating a state where the filtration unit 1 of FIG. 6 is applied to the filtration device 120.

The filtration device 120 in FIG. 8 filters ballast water of a ship, for example, and includes a casing 101 which forms an outer shell of the filtration device, a first partition wall 125, a filter element 2 including a tubular filter medium wall 3 which is vertically penetrated, a second partition wall 126, a cleaning pipe 130, and a cleaning fluid drain pipe 105.

The casing 101 includes a fluid inlet 106 through which a fluid from an outside flows in a lower part of a side wall and a fluid outlet 107 through which the fluid filtered inside is discharged to the outside in an upper part of the side wall.

The first partition wall 125 provided in a lower part inside the casing 101 is partitioned into a first raw fluid chamber 121a which causes the inside of the casing to communicate with the fluid inlet 106 and contains the fluid before being subjected to filtration and a filtrate chamber 122 which communicates with the fluid outlet 107 and contains the filtered fluid. A plurality of fluid inlet and outlet ports 5 are formed in several places for fitting and holding of a lower end of the filter element.

The lower ends of the plurality of filter elements 2 are fitted and held in the respective fluid inlet and outlet ports 5 of the first partition walls 125, and the inside of each filter element communicates with the first raw fluid chamber 121a to be disposed in parallel inside the filtrate chamber 122.

The filter element 2 causes a fluid as an object to pass from an inner side to an outer side of the filter medium wall 3 to capture and filter solid substances and gel-like dust contained in the fluid, and causes the fluid to flow in the axial direction of the filter element to wash an inner surface of the filter medium wall.

A second partition wall 126 forming a second raw fluid chamber 121b is provided on an upper end side of the filter element 2, and the fluid inlet and outlet port 50 provided in the second partition wall holds an upper end opening of the filter element.

In the present example, the second raw fluid chamber 121b and the first raw fluid chamber 121a communicate with each other through the inside of the filter element.

One end of the substantially L-shaped cleaning pipe 130 is connected to the lower opening of the filter element via the fluid inlet and outlet port 5, and the other end thereof is connected to the drain pipe 105. The washing pipe 130 sucks the fluid inside the filter element to generate an axial flow directed downward from the second raw fluid chamber 121b connected to the other end of the filter element, thereby peeling off captured substances adhering to the filter medium wall.

The cleaning pipe 130 is configured to be rotatable about a base end 131 thereof inside a horizontal plane, and a shaft 114 vertically extending at the center portion of the casing is rotated by a motor 116. Thus, the cleaning pipe 130 can be selectively connected to and disconnected from the lower end opening of any one of the filter elements.

At the time of filtration using this filtration device, an on-off valve of a washing fluid discharge system is closed and the suction by the washing pipe 130 is not performed. The fluid to be filtered flows into the first raw fluid chamber 121a from the fluid inlet 106 and flows into the inside from the lower end opening of the filter element, and then, passes through the filter medium wall and moves to the filtrate chamber 122 at a low pressure, thereby performing filtration. On the other hand, the fluid hardly flows from the first raw fluid chamber 121a into the filter element to which the cleaning pipe 130 is connected, but flows from the another end fluid inlet and outlet port 50 of the filter element via another filter element and the second raw fluid chamber 121b, so that the filtration is similarly performed.

At the time of cleaning, the on-off valve of the cleaning fluid discharge system is released, and the suction by the cleaning pipe 130 is started. Since the internal pressure of the filter element 2 to which the cleaning pipe is connected decreases, the raw fluid from the second raw fluid chamber 121b having a primary pressure passes through the inside of the filter element at high speed in the axially downward direction, and flows out to the cleaning pipe 130. At this time, the captured substances adhering to the filter medium wall are removed by the axial flow.

In addition, when the raw fluid from the second raw fluid chamber 121b passes through the inside of the filter element at high speed in the axially downward direction, the respective propellers 30 and 52 rotate to rotate the captured-substance removal tool 20, thereby promoting the peeling off of the captured substances adhering to the inner surface of the filter medium wall.

Incidentally, the propeller 52 is not necessarily provided in the case of applying the filtration unit of FIG. 6 to the filtration device 120.

Sixth Embodiment of Filtration Unit

Figure 9:
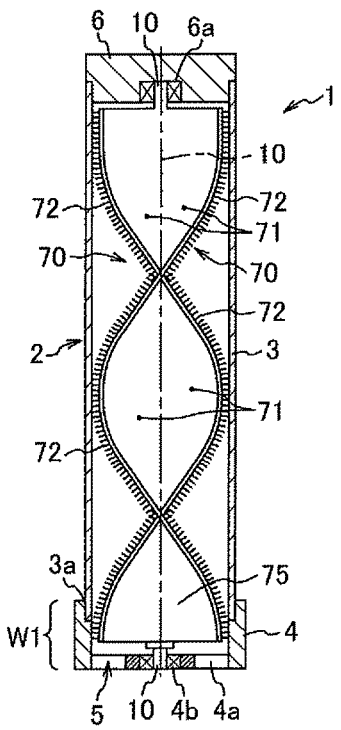
FIG. 9 is a longitudinal cross-sectional view of a filtration unit according to another embodiment of the present invention.

Next, FIG. 9 is a longitudinal cross-sectional view of a filtration unit according to another embodiment (a modification of the first embodiment) of the present invention. A description will be given by assigning the same reference numerals to the same parts as in the first embodiment.

The filtration unit 1 according to the present embodiment includes a plurality of (two in the present example) spiral blades 70 as the captured-substance removal tool 20, and is configured such that ends of the respective spiral blades 70 on the fluid inlet and outlet port 5 side function as propellers.

Each of the spiral blades 70 is configured of a blade main body 71 and a bristle portion 72 implanted along a circumferential edge on an outer diameter side of the blade main body, and both ends in the axial direction of the rotary shaft 10 are axially supported by bearings 4b and 6a. An end (propeller) 75 on the fluid inlet and outlet port 5 side of each of the spiral blades 70 passes over an end 3a on the fluid inlet and outlet port 5 side of the filter medium wall 3 and enters the fluid inlet and outlet port 5 side (within the axial range W1 of the fluid inlet and outlet port 5), and an inclination angle (inclination angle with respect to the axial direction), an area, a shape, and the like thereof are set so as to rotate the spiral blade 70 by receiving a filtration fluid and a backwashing fluid.

A case where the fluid inlet and outlet port is provided only on the lower side of the filter element 2 is illustrated in the illustrated configuration example, but fluid inlet and outlet port may be also provided on the upper side as illustrated in FIGS. 3 and 6. In the case where the fluid inlet and outlet port is provided on the upper side as illustrated in FIG. 6, another spiral blade-shaped propeller may be provided on the upper part of the rotary shaft.

Seventh Embodiment of Filtration Unit

Figure 10:
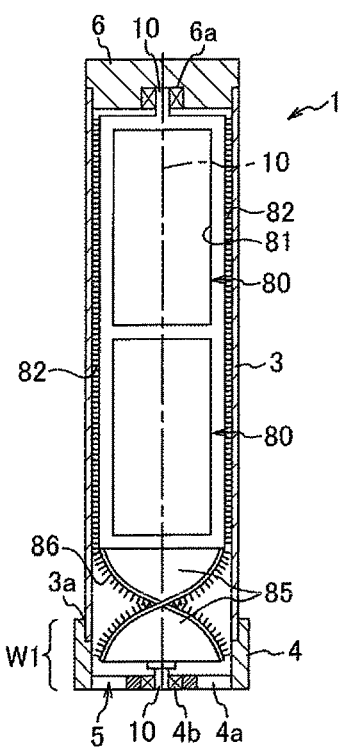
FIG. 10 is a longitudinal cross-sectional view of a filtration unit according to a modified embodiment of FIG. 9.

Next, FIG. 10 is a longitudinal cross-sectional view of the filtration unit according to the modified embodiment of FIG. 9.

The filtration unit 1 according to the present embodiment has a configuration in which two flat plate-shaped blades 80 are connected in series in the axial direction as the captured-substance removal tool 20, and is configured such that an end of the lower flat plate-shaped blade 80 on the fluid inlet and outlet port 5 side functions as a propeller 85.

Each of the flat plate-shaped blades 80 is configured of a rectangular annular blade main body 81 and a bristle portion 82 implanted along a circumferential edge on an outer diameter side of the blade main body, and both ends in the axial direction of the rotary shaft 10 are axially supported by the bearings 4b and 6a, respectively. The propeller 85 in having a spiral blade shape is connected to the end of the lower plate-shaped blade 80 on the fluid inlet and outlet port 5 side, and the propeller 85 passes over the end 3a of the filter medium wall 3 on the fluid inlet and outlet port 5 side and enters into the fluid inlet and outlet port 5 side (within the axial range W1 of the fluid inlet and outlet port 5), and a shape, an area, and the like thereof are set so as to rotate the flat plate-shaped blade 80 by receiving the filtered fluid and the backwashing fluid. In addition, it is configured such that the bristle portion 86 is provided on the outer circumferential edge of the propeller 85 so as to remove captured substances adhering to the inner surface of the filter medium wall.

A case where the fluid inlet and outlet port is provided only on the lower side of the filter element 2 is illustrated in the illustrated configuration example, but fluid inlet and outlet port may be also provided on the upper side as illustrated in FIGS. 3 and 6. In the case where the fluid inlet and outlet port is provided on the upper side as illustrated in FIG. 6, another spiral blade-shaped propeller may be provided on the upper part of the rotary shaft.

<Summary of Configuration, Operation, and Effect of the Present Invention>

The filtration unit 1 or 60 according to a first aspect of the present invention is characterized by including: the hollow tubular filter element 2 which includes the tubular filter medium wall 3 and causes the fluid to flow bidirectionally among the fluid inlet and outlet port 5 provided at least at one end in the axial direction of the filter medium wall, the inside of the filter medium wall, and the outside of the filter medium wall; the captured-substance removal tool 20 which is rotatable about the rotary shaft 10 parallel with the axial direction and slidably contacts the inner surface of the filter medium wall during rotation, inside the filter element; and the blade (propeller) 30, 52, 75 or 85 which is disposed at the fluid inlet and outlet port 5 side inside the filter element and rotates integrally with the captured-substance removal tool by receiving the fluid.

The hollow tubular filter element 2 includes the fluid inlet and outlet port 5 provided at least at one end in the axial direction and the filter medium wall 3 provided on the outer circumference, performs the filtration by causing the fluid flowing into the inside from the fluid inlet and outlet port to flow out to the outside via the filter medium wall provided on the outer circumference, and performs the backwashing by causing the backwashing fluid flowing into the inside from the outside of the filter medium wall to be discharged from the fluid inlet and outlet port. The fluid inlet and outlet port 5 as the opening is provided at least at one end in the axial direction of the filter element, and the other end in the axial direction of the filter element is either a closed type or an opened type.

The filter medium wall 3 has the tubular shape. The term "tubular" widely includes the case of having the same diameter (inner diameter or outer diameter) over the entire length in the axial direction and the case of having the cone shape (tapered shape) of which diameter (inner diameter or outer diameter) gradually increases or gradually decreases from one end toward the other end in the axial direction.

The captured-substance removal tool 20 is axially supported to be rotatable about the rotary shaft 10 parallel with the axial direction inside the filter element, and slidably contacts with the inner surface of the filter medium wall during rotation, thereby peeling off and removing the captured substances.

The blades 30, 52, 75, and 85 are disposed on the fluid inlet and outlet port side (the region where the flow amount and the flow rate at the time of backwashing become the maximum) in the filter element, and rotate integrally with the captured-substance removal tool by receiving the fluid and the backwashing fluid.

The blade 52 disposed on the fluid inlet and outlet port 50 side in the embodiment of FIG. 6 plays the role of rotating the captured-substance removal tool 20. Accordingly, it is possible to eliminate the remaining of the captured substances by increasing the flow amount and the flow rate on the other end side (the region separated from the fluid inlet and outlet port 50) in the axial direction where the inflow amount of the backwashing fluid is likely to decrease during backwashing, and further to enhance the entire flow rate inside the filter element.

That is, even when the resistance of the filter medium wall is low, the blade 52 increases the inflow amount of the backwashing fluid at the position separated from the fluid inlet and outlet port 5 by the rotation of the blade. Further, it is possible to remove the captured substances by the rotation of the captured-substance removal tool and to enhance the backwashing effect even with a small amount of the backwashing fluid. It is possible to prevent generation of local residues through stirring obtained by the rotation of the blade 52. Further, it is possible to enhance the effect of removing the captured substances and deploying the captured substances in the fluid since it is possible to rotate the captured-substance removal tool.

On the other hand, the blades 30, 75, and 85 according to the other embodiments aid in removing the captured substances by brushing with the removal member when the captured substances adhering to the filter medium wall surface are removed by backwashing, and at the same time, rotate to stir the inside of the filter element so as to prevent the captured substances from remaining.

The bristle portion (captured-substance removal member) may be provided on the outer circumferential edge of the blade to remove the captured substances adhering to the filter medium wall.

When the filtering resistance of the filter medium wall is low, the flow amount of the backwashing fluid flowing in the filter element is changed mainly depending on the resistance of the flow path. On the other hand, when the filtration resistance of the filter medium wall is high, the flow amount of the backwashing fluid flowing in the filter element is changed mainly depending on the filtration resistance of the filter medium wall.

Since the flow path resistance is low on the fluid inlet and outlet port 5 side provided at one end in the axial direction during backwashing, and the flow amount in this region increases when the filtering resistance of the filter medium wall is low, the backwashing fluid is likely to flow into the portion with the low flow path resistance, and the inflow amount of the backwashing fluid toward the other end side in the axial direction significantly decreases. Thus, when the resistance of the filter medium wall is low, it becomes difficult to perform backwashing without unevenness over the entire length in the axial direction of the filter element.

In the present invention, it is possible to prevent the generation of local residues by increasing the inflow amount of the backwashing fluid at the position separated from the fluid inlet and outlet port 5 by the rotation of the blade even when the filtration resistance of the filter medium wall is low. Further, it is possible to enhance the effect of removing the captured substances and deploying the captured substances in the fluid since it is possible to rotate the captured-substance removal tool.

Incidentally, the inflow amount at the time of backwashing is small at the other end of the filter medium wall separated from the fluid inlet and outlet port, and thus, it is difficult to apply the rotational force to the captured-substance removal tool by the inflow fluid in this region as described above. Even if the captured-substance removal tool is rotated by the inflow fluid in this region, the rotational force thereof is insufficient to remove the captured substances. Even in such a case, it is possible to rotate the captured-substance removal tool at increased speed by providing the blade on the fluid inlet and outlet port side.

The filtration unit according to a second aspect of the present invention is characterized in that, when the inner diameter of the filter medium wall 3 on the fluid inlet and outlet port 5 or 50 side, is $L1$, at least a part of the blade 30, 52, 75, or 85 is positioned within the axial range of the distance of $L1 \times 1$ from the effective end (end in the region where the filter medium wall can effectively function as the filter medium) 3a of the filter medium wall 3.

At least one blade forming the propeller may be used, but a configuration in which two or more blades are disposed at a uniform pitch in the circumferential direction is preferable in consideration of the rotational balance. The blade is provided at a position through which the entire backwashing fluid flowing in from the filter medium wall during backwashing passes, specifically the filter medium wall and a region having the opening (fluid inlet and outlet port) provided at the end in the axial direction of the filter element as the center.

When the end of the filter medium wall is held (covered) by the end sleeve 4, it is possible to rotate the blade (captured-substance removal tool) while avoiding the interference with the captured-substance removal tool disposed within an effective region of the filter medium wall by disposing at least a part of the blade inside the end sleeve 4. When there is no end sleeve, it is possible to rotate the blade by utilizing the fluid at the maximum flow speed by disposing the blade in an appropriate axial range around the fluid inlet and outlet port, which is the end opening of the filter medium wall.

More specifically, when the end sleeve 4 is present, there is no problem even if the range in which the blade is disposed falls within the axial range of the distance of the inner diameter $L1 \times 1$ of the filter medium wall from the effective end 3a of the filter medium wall 3 beyond the range W1 of the end sleeve. When the end sleeve 4 is not present, the blade is disposed in a region in the vicinity of the opening at one end of the filter medium wall 3 and in which the flow speed at the time of backwashing is maximized or nearly maximized (within the axial range of the distance of the inner diameter $L1 \times 1$ of the filter medium wall from the effective end 3a). At this time, it is a matter of course to pay attention to avoid the interference with the captured-substance removal tool. A part of the blade may project outward beyond the fluid inlet and outlet port.

The range in which the blade is disposed widely includes not only a range in which an inner diameter portion of the blade (portion coupled with the rotary shaft) is disposed but also a range in which other portions of the blade are disposed. Incidentally, the respective backwashing nozzles are alternately connected to the upper and lower openings of the filter element in the filtration device of FIG. 5, and thus, it is necessary to pay attention to avoid the interference between these movable portions and the blade.

The filtration unit according to a third aspect of the present invention is characterized in that the other end in the axial direction of the filter element is closed by the another end member 6.

This corresponds to the embodiment of FIGS. 1A and 1B, and relates to the type in which one end in the axial direction of the filter element is opened.

The filtration unit according to a fourth aspect of the present invention is characterized in that the through hole 41 and the check valve 45, which is opened during backwashing to discharge the fluid flowing into the inside from the outside of the filter medium wall to the outside from the through hole, are provided at the other end in the axial direction of the filter element.

When the other end in the axial direction is closed, the inflow amount of the backwashing fluid in this portion decreases or the backwashing fluid that has flowed in easily remains. However, it is possible to eliminate the remaining of the backwashing fluid by providing the through hole and the check valve to open or close the through hole at the other end in the axial direction (FIG. 3).

The filtration unit according to a fifth aspect of the present invention is characterized in that the filter element 2 has the fluid inlet and outlet ports 5 and 50 at both the ends thereof in the axial direction, and the blades 30 and 52 are provided on sides of the fluid inlet and outlet ports, respectively.

This corresponds to the embodiment of FIG. 6, and both the blades which rotate integrally during backwashing are configured to move the backwashing fluid in the filter element in one direction.

The filtration unit according to a sixth aspect of the present invention is characterized by having a configuration in which the another end openings in the axial direction of the two filter elements, which have both the opened ends in the axial direction, are connected in series in a communicating state.

In one configuration example, the captured-substance removal tools in the respective filter elements are individually rotated in an independent manner in the state of being disposed on the same axis. The filtration unit according to the present invention that is provided with the propeller (blade) can also be applied to a filter element of a type in which the backwashing fluid flowing into the inside from the filter medium wall is discharged from both the ends in the axial direction of the filter element (FIG. 4).

As another configuration example, the respective captured-substance removal tools in the two filter elements connected in series may be coaxially integrated so as to integrally rotate (FIGS. 5 and 7).

A seventh aspect of the present invention is characterized in that, the fluid in the inside of the filter medium wall is moved in one direction when the fluid flowing into the inside of the filter medium wall 3 causes the respective blades 30 and 52 arranged, respectively, on the sides of the respective fluid inlet and outlet ports 5 and 50 to rotate integrally.

Accordingly, it is possible to remarkably increase the backwashing effect (FIG. 6).

The filtration unit according to an eighth aspect of the present invention is characterized in that the respective captured-substance removal tools 20 in the two filter elements are configured to rotate integrally or to individually rotate in an independent manner.

The respective blades and the respective captured-substance removal tools may be integrally rotated by integrating the respective rotary shafts 10 (FIG. 6), or the respective blades and the respective captured-substance removal tools may be individually rotated in an independent manner by supporting the respective rotary shafts 10 individually by bearings (FIG. 4).

The filtration unit according to a ninth aspect of the present invention is characterized in that at least a part of the captured-substance removal tool is formed in the spiral shape.

The captured-substance removal tool 20 may be formed in the spiral blade shape or a flat plate shape in the entire length or a part thereof. Since it is easy to configure the spiral blade to be elastically deformed, the spiral blade can smoothly rotate while being deformed to contract even when the resistance against the rotation during backwashing is strong.

When the fluid flows in the direction opposite to that at the time of backwashing during filtration, the spiral blade expands in diameter to increase the sliding resistance between the spiral blade and the filter medium wall, thereby stopping the rotation or reducing the rotational speed.

Incidentally, there is no intention to indicate that it is necessary to perform the rotation stop or decrease the rotational speed of the captured-substance removal tool during filtration.

The filtration unit according to a tenth aspect of the present invention is characterized in that the blade forms a part of the captured-substance removal tool.

As long as the blade rotates integrally with the captured-substance removal tool, both the members may be separated or connected.

Incidentally, the filtration unit or the filtration device that is provided with the filtration unit according to the present invention can be applied for filtration of sea water (for example, ballast water of a ship), lake water, river water, and water of water supply, sewer, and the like, filtration of a liquid used in general industries such as cooling water or a process liquid of various devices, filtration of various raw material gases and the like used in chemical factories and can capture and remove fine particles, dust, and the like contained therein.

What is claimed is:

1. A filtration unit comprising a hollow tubular filter element, said filter element comprising:
   a tubular filter medium wall,
   a first end which is one end in an axial direction of the filter element,
   a second end which is an end opposite to the first end in an axial direction of the filter element,
   a first fluid inlet and outlet port provided at the first end,
   a second fluid inlet and outlet port provided at the second end,
   a captured-substance removal tool provided rotatably around the axial direction in the filter element, which slidably contacts an inner surface of the filter medium wall during rotation,
   a first blade disposed in the vicinity of the first fluid inlet and outlet port, which rotates the removal tool by receiving a fluid passing through the first fluid inlet and outlet port, and
   a second blade disposed in the vicinity of the second fluid inlet and outlet port, which rotates the removal tool by receiving a fluid passing through the second fluid inlet and outlet port,
   wherein the captured-substance removal tool consists of a first captured-substance removal tool and a second captured-substance removal tool, said first captured-substance removal tool and said second captured-substance removal tool being connected in series in such a manner that the first captured-substance removal tool and the second captured-substance removal tool independently operable,
   the filtration unit further comprises bearings between an end opposite to the first blade in the axial direction of the first captured-substance removal tool and an end opposite to the second blade in the axial direction of the second captured-substance removal tool,
   the bearings axially support the first captured-substance removal tool and the second captured-substance removal tool to be rotatable independently,
   said first blade integrally rotates said first captured-substance removal tool, and
   said second blade integrally rotates said second captured-substance removal tool,
   a direction of rotation by receiving the fluid passing through the first fluid inlet and outlet port from the interior of the filter media wall, of the first blade, and
   a direction of rotation by receiving the fluid passing through the second fluid inlet and outlet port from the interior of the filter media wall, of the second blade, are in opposite directions from each other when viewed from the same direction.

2. The filtration unit according to claim 1, wherein
said filter element consists of a first filter element and a second filter element;
said filter medium wall consists of a first filter medium wall and a second filter medium wall,
said first filter element comprises the first filter medium wall, said first fluid inlet and outlet port, said first captured substance removal tool and said first blade;
said second filter element comprises the second filter medium wall, said second fluid inlet and outlet port, said second captured substance removal tool and said second blade; and
said first filter element and said second filter element are serially connected in such a manner to have a fluid communication therebetween.

* * * * *